Feb. 22, 1966    G. E. BRAM    3,236,528
SEALING ELEMENT FOR COMPOSITE PIPES AND
PIPE JOINT INCLUDING SAID ELEMENT
Filed April 8, 1963
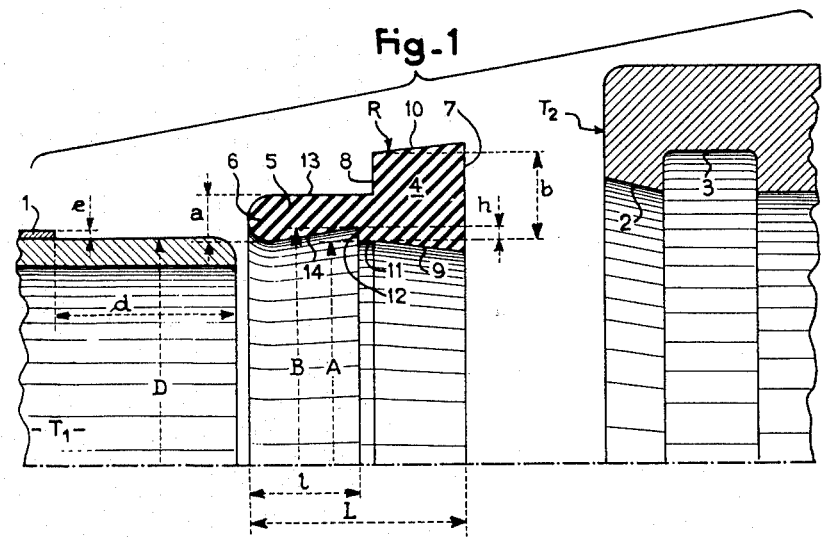
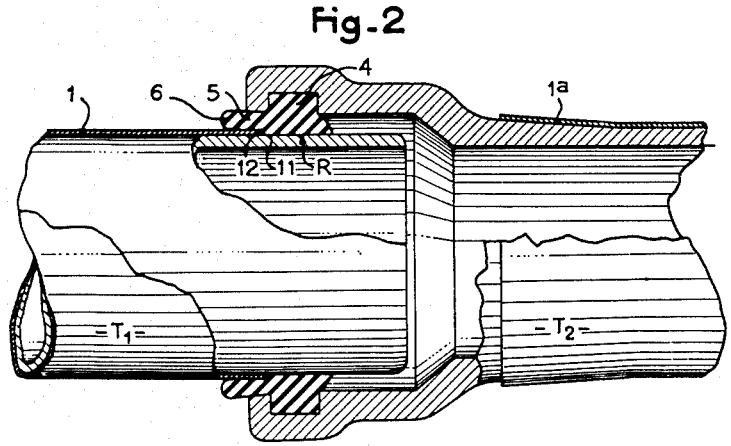
Inventor:
Georges Eugène BRAM
by: J. Delattre-Seguy
Attorney

United States Patent Office 3,236,528
Patented Feb. 22, 1966

3,236,528
SEALING ELEMENT FOR COMPOSITE PIPES AND PIPE JOINT INCLUDING SAID ELEMENT
Georges Eugene Bram, Pont-a-Mousson, France, assignor to Centre de Recherches de Pont-a-Mousson, Pont-a-Mousson, France, a corporation of France
Filed Apr. 8, 1963, Ser. No. 271,336
Claims priority, application France, Apr. 27, 1962, 895,838, Patent 1,329,061
6 Claims. (Cl. 277—11)

The present invention relates to sealing elements for bell and spigot tubular elements which have on their cylindrical part a thin rigid sheath which terminates at a distance from the ends of the corresponding tubular element.

The object of the invention is to provide an improved sealing element which affords a perfect seal between the pipes for high service pressures and precludes any penetration of liquid inside or outside the pipe between the sheath and the cylindrical part of the pipe element that this sheath covers.

This improved sealing ring comprises in combination with a polygonal massive body, a lip which terminates in a bulge portion and is constricted in the region thereof adjacent the massive body to which it is connected internally by a low step and externally by a shoulder roughly midway of said massive body.

Another object of the invention is to provide an automatically sealed joint between two composite tubular elements each of which is provided on the cylindrical part thereof with a thin rigid sheath which terminates at a distance from the ends of the element, wherein the sealing ring is compressed radially through the massive body thereof between the bell of one of the tubular elements and the unsheathed part of the spigot end of the other element, whereas the bulged lip of the sealing ring disposed adjacent the entrance of the bell is clamped elastically on the sheath of thermoplastic material of said other element and the end face of this sheath abuts against the inner step of the sealing ring.

Further features and advantages of the invention will be apparent from the ensuing description, with reference to the accompanying drawing to which the invention is in no way limited.

In the drawing:

FIG. 1 is an axial radial sectional view of a sealing ring according to the invention and the corresponding ends of two tubular elements it is intended to assemble, and FIG. 2 is a longitudinal sectional view of the joint obtained between these two bell and spigot tubular elements with interposition therebetween of said sealing ring, the sectional view being on a scale smaller than that of FIG. 1.

In the embodiment shown in FIG. 1, the elastically yieldable sealing ring R is adapted to be compressed between two pipes $T_1$ and $T_2$. The cylindrical part of the pipe $T_1$, having an outside diameter D, is covered with a tubular thermoplastic sheath 1 having a thickness $e$ and terminating at a distance $d$ from the end face of the spigot end of this pipe $T_1$. This sheath is composed of rigid thermoplastic material such as rigid polyvinyl chloride. The bell end of the pipe $T_2$ has an opening 2, for example of frustoconical shape, whose minimum diameter is substantially greater than the diameter D and which comprises a circular recess 3 for accommodating a part of the sealing ring R. The corresponding end of the outer sheath of the pipe $T_2$ is shown at $1a$ in FIG. 2.

The sealing ring R comprises a massive body 4 which is extended in accordance with the invention by a flexible lip 5 having an end bulge portion 6.

The massive body 4 is adapted to be disposed in the recess 3 of the bell end of the pipe $T_2$ and has a roughly trapezoidal section whose large base 7 constitutes the end face of the ring, whereas the smaller base forms a transverse shoulder 8 connecting this body to the lip 5. The oblique sides of this trapezoidal section are formed by portions of the inner and outer faces 9 and 10 of the ring which are of frustoconical shape and converge in the direction of the lip 5. The inner frustoconical face 9 has a large diameter A which is slightly less than, or at the most equal to, the outside diameter D of the pipe $T_1$ in the unsheathed part of the latter. The outer face 10 has a small diameter corresponding to the inside diameter of the recess 3 of the bell. The minimum radial thickness $b$ of the body 4 in the free uncompressed state is greater than the radial space between the spigot of the pipe $T_1$ and the recess 3 of the pipe $T_2$.

The inner face 9 is extended adjacent the large diameter end thereof by a short cylindrical portion 11 which is connected to the lip 5 by a step or projection 12 constituting an annular shoulder having a height or radial dimension $h$ which is at least equal to or slightly greater than, the thickness $e$ of the plastic sheath 1 covering the pipe $T_1$.

The lip 5 has an axial length $l$ which is around one half of the total axial length L of the ring R and comprises an outer face 13 which is roughly cylindrical and an inner face 14 which is frustoconical and converges in the direction from the step 12, in the region of which the lip consequently has a constriction.

The outside diameter of the face 13 in the uncompressed condition is slightly less than the minimum diameter of the frustoconical opening 2 of the entrance of the bell.

The maximum diameter B of the inner face 14 in the vicinity of the step 12 is slightly less than, or at the most equal to, the diameter $D+2e$ of the sheathed pipe $T_1$.

The thickness of the lip 5 is maximum in the region of the bulge 6 where its thickness $a$ is around one-half the minimum radial thickness $b$ of the body 4.

The pipes $T_1$ and $T_2$ are assembled in the following manner (FIG. 2):

The body 4 of the ring R is first placed in the recess 3 in the bell end of the pipe $T_2$, the lip 5 being disposed in the entrance 2 of the bell.

With the pipes $T_1$ and $T_2$ brought together in alignment the spigot end of the pipe $T_1$ is inserted into the bell end of the pipe $T_2$ after elastic expansion of the bulge portion 6 of the lip 5. As soon as the unsheathed part of the spigot end of the pipe $T_1$ penetrates the opening in the ring R defined by the inner face 9, the body 4 of the ring is progressively radially compressed in the recess 3 in the known manner. At a given moment the sheath 1 of the pipe $T_1$ comes in contact with the bulge portion 6 of the lip 5. It passes through this bulge portion in elastically expanding the latter. After the end of the spigot end of the pipe $T_1$ has passed through the ring R, the penetration of this spigot end is stopped when the end face of the sheath 1 abuts against the ring step 12 provided for this purpose. Owing to the rigidity of the sheath 1, the abutment of its end face against this step 12 is distinct and consequently felt by the pipe assemblers.

The pipes have now been assembled in the manner shown in FIG. 2. The massive body 4 of the ring R is highly compressed in the known manner between the pipes $T_1$ and $T_2$ and this provides the seal irrespective of the pressure in the pipe. On either side of the step 12 the lip 5 is elastically clamped on the sheath 1 and the cylindrical face 11 is elastically clamped on the unsheathed end of the pipe $T_1$. This elastic clamping of the ring R against both the sheath 1 and the unsheathed end of the pipe $T_1$ is insured in particular by the diameters A and B of the ring in the free state, these diameters being less than, or at the most equal to, the corresponding dimensions of the end of the pipe $T_1$.

Therefore, advantageously, irrespective of its pressure, the fluid contained in the pipes can neither escape to the outside nor infiltrate between the sheatth 1 and the spigot end of the pipe $T_1$, since it is arrested by the high pressure of contact between the faces 9–11 of the massive body 4 and the unsheathed end of the pipe $T_1$. The liquids in the ground in which the piping is embedded cannot infiltrate into the piping since they are stopped by the bulge portion 6 of the lip 5 clamped round the sheath 1.

As concerns the lip 5, its constriction adjacent the massive body 4 and its relatively great length imparts thereto flexibility and freedom of movement relative to the massive body 4. It is owing to these features that the possible small displacements of the massive body 4 under the effect of the pressure of the fluid do not affect the clamping of the sheath 1 by the lip 5. This clamping is moreover insured by the end bulge portion 6 which behaves in the manner of a toric ring connected by a flexible lip to the massive body 4 of the sealing ring R. Consequently owing to the lip 5, the step 12 and the adjacent inner face 11 of the sealing ring, the seal is perfect between the sheath 1 and the pipe $T_1$.

The function of the step 12 is to limit the penetration of the spigot end of the pipe $T_1$ into the bell end of the pipe $T_2$ and thereby avoid that the sheath 1 becomes interposed between the massive body 4 and the pipe $T_1$. In this way fluid cannot at any time infiltrate between the sheath 1 and the pipe $T_1$. Further, the step 12 precludes electric contact between the two pipes while allowing axial expansion thereof.

Although a specific embodiment of the invention has been described, many modifications and changes may be made therein without departing from the scope of the invention as defined in the appended claims.

Having now described my invention what I claim as new and desire to secure by Letters Patent is:

1. Elastic sealing ring for an automatic joint between two bell and spigot pipe elements each of which is provided with a thin rigid outer thin sheath which terminates at a distance from the ends of the corresponding pipe element, said ring comprising in combination with a polygonal massive body, a lip which terminates in a bulge portion and is constricted in the region thereof adjacent the massive body to which it is connected internally by a low step and externally by a shoulder roughly midway of said massive body, the lip being defined externally by a cylindrical face and internally by a frustoconcial face which converges toward the bulge portion.

2. Annular elastic sealing ring for an automatic joint between two pipe elements each of which is provided with a bell end and a spigot end and a thin rigid outer thin sheath which terminates at a distance from the ends of the corresponding pipe element, said ring comprising in combination with an annular polygonal-sectioned massive body portion, an annular lip portion which terminates in an annular bulge portion having a radial extent less than that of the massive body portion and is constricted in the region thereof adjacent the massive body portion to which it is connected internally by a first annular shoulder and externally by a second annular shoulder which has a radial extent substantially half of the radial extent of said massive body portion, the radial extent of the first shoulder being less than that of the second shoulder and the bulge portion defining an opening of larger diameter than the opening defined by the massive body portion.

3. Sealing ring as claimed in claim 2, wherein the massive body portion has a trapezoidal cross-sectional shape defined internally and externally by frustoconical faces which converge toward the lip portion.

4. Sealing ring as claimed in claim 2, wherein the axial length of the lip portion is substantially one half of the total axial length of the sealing ring.

5. Sealing ring as claimed in claim 2, wherein the first shoulder has a radial extent equal to the thickness of the sheath of the spigot end and is connected to the inner face of the massive body portion by a portion having a cylindrical face.

6. Automatically sealed joint between two composite tubular elements each of which is provided with a bell end and a spigot end and externally on the cylindrical part thereof with a thin rigid sheath which terminates at a distance from the ends of the corresponding tubular element, said joint comprising a sealing ring having an annular polygonal-sectioned massive body portion extended by an annular lip portion which terminates in an annular bulge portion having a radial extent less than that of the massive body portion and has a constriction adjacent the massive body portion to which it is connected internally by a first annular shoulder and externally by a second annular shoulder which has a radial extent substantially half the radial extent of said massive body portion, said sealing ring being deformed radially in the part thereof corresponding to said massive body portion between the inner face of the bell end of one of the tubular elements and the part of the spigot end of the other tubular element which is devoid of said sheath, whereas the lip portion of the sealing ring directed toward the entrance of the bell end is elastically clamped on the thin sheath of said other tubular element and the end face of said thin sheath abuts against the first shoulder of said sealing element.

References Cited by the Examiner
UNITED STATES PATENTS

| | | | |
|---|---|---|---|
| 2,926,937 | 3/1960 | Parsons | 285—350 |
| 2,991,092 | 7/1961 | MacKay | 277—170 |
| 3,031,200 | 4/1962 | Homer | 277—4 |

SAMUEL ROTHBERG, *Primary Examiner.*

E. DOWNS, *Examiner.*